(12) United States Patent
Chandrasekaran (10) Patent No.: US 11,680,515 B1
(45) Date of Patent: Jun. 20, 2023

(54) INTAKE AND CHARGE AIR COOLING SYSTEM WITH PASSIVE VARIABLE CHARGE ENABLER

(71) Applicant: Vetrivel Chandrasekaran, Farmington Hills, MI (US)

(72) Inventor: Vetrivel Chandrasekaran, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/710,372

(22) Filed: Mar. 31, 2022

(51) Int. Cl.
| | |
|---|---|
| *F02B 29/04* | (2006.01) |
| *F01P 5/10* | (2006.01) |
| *F02B 37/12* | (2006.01) |
| *B60H 1/32* | (2006.01) |
| *B60H 1/00* | (2006.01) |
| *F02M 35/10* | (2006.01) |

(52) U.S. Cl.
CPC ..... *F02B 29/0443* (2013.01); *B60H 1/00735* (2013.01); *B60H 1/323* (2013.01); *F01P 5/10* (2013.01); *F02B 29/0462* (2013.01); *F02B 29/0468* (2013.01); *F02B 37/12* (2013.01); *F02M 35/10157* (2013.01); *B60H 2001/00949* (2013.01); *F01P 2025/08* (2013.01)

(58) Field of Classification Search
CPC ............. F02B 29/0443; F02B 29/0462; F02B 29/0468; F02B 37/12; B60H 1/00735; B60H 1/323; B60H 2001/00949; F01P 5/10; F01P 2025/08; F02M 35/10157
See application file for complete search history.

(56) References Cited

U.S. PATENT DOCUMENTS

| | | |
|---|---|---|
| 4,317,439 A | 3/1982 | Emmerling |
| 6,748,934 B2 | 6/2004 | Natkin et al. |
| 6,796,134 B1 | 9/2004 | Bucknell et al. |
| 7,010,927 B2 | 3/2006 | Lifson et al. |
| 9,217,592 B2 | 12/2015 | Turney et al. |
| 9,506,395 B2 | 11/2016 | Isermeyer et al. |
| 10,006,339 B2 | 6/2018 | Chen et al. |
| 10,365,022 B2 | 7/2019 | Goel et al. |
| 10,830,122 B2 | 11/2020 | Lott et al. |
| 10,830,515 B2 | 11/2020 | Laughman et al. |
| 2003/0015183 A1 | 1/2003 | Sealy et al. |
| 2005/0072169 A1 | 4/2005 | Lin |
| 2006/0086089 A1 | 4/2006 | Ge |
| 2007/0204614 A1 | 9/2007 | Kolb |
| 2009/0145409 A1 | 6/2009 | Noyama et al. |
| 2010/0139626 A1 | 6/2010 | Raab et al. |
| 2011/0041523 A1 | 2/2011 | Taras et al. |

(Continued)

*Primary Examiner* — Loren C Edwards
*Assistant Examiner* — Edward Bushard
(74) *Attorney, Agent, or Firm* — Ralph E. Smith (57) ABSTRACT

An air cooling system for a vehicle engine includes an air intake configured to receive intake air for delivery to the engine, a first coolant loop thermally coupled to the air intake to provide cooling to the intake air, and a pump for circulating coolant through the first coolant loop. A second coolant loop is thermally coupled to the air intake to provide further cooling to the intake air, and undergoes a vapor compression cycle. A compressor circulates coolant through the second coolant loop. The first and second coolant loops are separate loops using a common condenser. A passive variable charge enabler assembly is configured to remove coolant circulating in the system when the compressor is on.

20 Claims, 4 Drawing Sheets

(56) References Cited

U.S. PATENT DOCUMENTS

| | | |
|---|---|---|
| 2011/0203304 A1 | 8/2011 | Sato et al. |
| 2013/0068202 A1 | 3/2013 | Kardos et al. |
| 2014/0374498 A1 | 12/2014 | Quix et al. |
| 2015/0040874 A1 | 2/2015 | Isermeyer et al. |
| 2017/0045278 A1 | 2/2017 | Uselton |
| 2018/0215234 A1 | 8/2018 | Lott et al. |
| 2020/0131979 A1* | 4/2020 | Lott ................... F02B 29/0412 |

\* cited by examiner

INTAKE AND CHARGE AIR COOLING SYSTEM WITH PASSIVE VARIABLE CHARGE ENABLER

FIELD

The present application generally relates to cooling vehicle engine intake air and, more particularly, to cooling intake air with a dual coolant loop having a passive variable charge enabler.

BACKGROUND

Some conventional vehicles include a turbocharger and/or a supercharger, which increase the air or air/fuel mixture density of an engine by increasing the pressure of the intake air stream prior to its entering a cylinder of the engine. Increasing the density of air in the cylinder may be desirable because it provides a method of increasing the power generated by the engine. Since pressure is directly related to heat, as the charger increases the pressure of the intake air stream, it also increases the temperature. Cooling of this charged intake air stream enables an additional increase in its pressure since cooler air can be more densely packed. This additional cooling is typically accomplished through the use of a charge air cooler (CAC).

Some CACs may include a secondary cooling feature provided by an additional component such as, for example, a vehicle air conditioning circuit. However, such systems typically continuously draw cooling from the additional component, thereby overworking the system and reducing its performance. Moreover, the additional component will need to be increased in size to support the secondary cooling in addition to its primary operation. Accordingly, while such conventional CAC cooling systems work for their intended purpose, it is desirable to provide an improved CAC cooling system with improved control features.

SUMMARY

According to one example aspect of the invention, an air cooling system for a vehicle engine is provided. In one example implementation, the system includes an air intake configured to receive intake air for delivery to the engine, a first coolant loop thermally coupled to the air intake to provide cooling to the intake air, and a pump for circulating coolant through the first coolant loop. A second coolant loop is thermally coupled to the air intake to provide further cooling to the intake air, and undergoes a vapor compression cycle. A compressor circulates coolant through the second coolant loop. The first and second coolant loops are separate loops using a common condenser. A passive variable charge enabler (PVCE) assembly is configured to remove coolant circulating in the system when the compressor is on.

In addition to the foregoing, the described system may include one or more of the following features: wherein the PVCE assembly includes a housing defining an inner volume, and a separator device disposed within the housing and separating the inner volume into first and second volumes, wherein the first volume is configured to receive the removed coolant; wherein the PVCE assembly includes a housing having a first port and a second port each fluidly coupled to at least one of the first and second coolant loops, wherein a pressure differential across the PVCE assembly causes the PVCE assembly to receive the removed coolant; and wherein the first port is a high pressure port fluidly coupled to the first coolant loop at a location having high pressure liquid coolant.

In addition to the foregoing, the described system may include one or more of the following features: wherein the second port is a low pressure port fluidly coupled to the second coolant loop; wherein the second coolant loop further includes an expansion valve, and wherein the second port is fluidly coupled to the second coolant loop at a location downstream of the expansion valve and upstream of the compressor; wherein the first port is fluidly coupled to the first coolant loop at a location downstream of the condenser; and wherein the intake air is compressed charge air received from a turbocharger or a supercharger, and wherein the air intake includes an CAC configured to cool the compressed charge air, wherein the first coolant loop is thermally coupled to the CAC to provide cooling to the compressed charge air, and wherein the second coolant loop is thermally coupled to the CAC to provide further cooling to the compressed charge air.

In addition to the foregoing, the described system may include one or more of the following features: wherein the CAC includes a first charge air cooler layer and a second charge air cooler layer, the first and second charge air cooler layers being distinct layers; wherein the first coolant loop is thermally coupled to the first charge air cooler layer and the second coolant loop is thermally coupled to the second charge air cooler layer; wherein the first and second coolant loops circulate a shared refrigerant; and an HVAC branch conduit fluidly coupled to the second coolant loop between a first location upstream of the air intake, and a second location downstream of the air intake, and a vehicle HVAC evaporator thermally coupled to the HVAC branch conduit.

In addition to the foregoing, the described system may include one or more of the following features: wherein the second coolant loop includes an expansion valve upstream of the CAC and downstream of the condenser; wherein the second coolant loop includes a first internal heat exchanger and a second internal heat exchanger, wherein the first internal heat exchanger is disposed upstream of the expansion valve and downstream of the condenser, and the second internal heat exchanger is disposed downstream of the CAC and upstream of the compressor.

In addition to the foregoing, the described system may include one or more of the following features: a controller in signal communication with the pump and the compressor, wherein upon receipt of a signal indicating a first measured air charge temperature (ACT) is greater than a target ACT, the controller is configured to turn the pump on; wherein upon receipt of a signal indicating a second measured ACT is greater than the target ACT, the controller is configured to turn the compressor on; wherein upon receipt of a signal indicating a third measured ACT is greater than the target ACT, the controller is configured to de-rate the vehicle engine; wherein upon receipt of a signal indicating the third measured ACT is less than the target ACT, the controller is configured to turn off the compressor, and wherein upon receipt of a signal indicating the second measured ACT is less than the target ACT, the controller is configured to turn off the pump; wherein the separator is a piston; and wherein the separator is a diaphragm.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein is an intake air cooling system configured to provide cooling to intake air passing into a naturally aspirated engine or charge air passing through a dual layer charge air cooler (CAC). In a forced induction engine, a first coolant circuit provides cooling to the first layer of the CAC, and a second coolant circuit provides further cooling to the second layer of the CAC. The two coolant circuits share a coolant and a condenser, which eliminates the need for a dedicated low temperature cooling circuit. A passive variable charge enabler (PVCE) is configured to passively add/remove refrigerant from the first coolant circuit without valves or controllers depending on whether the second coolant circuit is operational.

Figure 1:
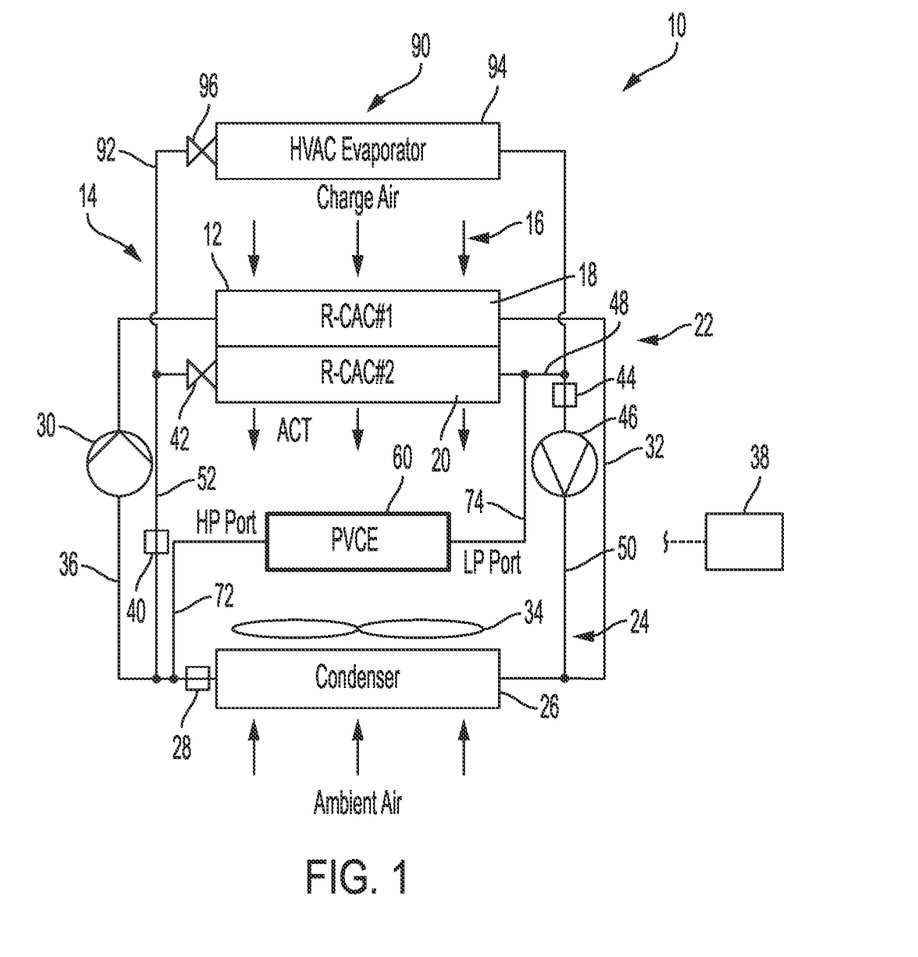
FIG. 1 is a schematic view of an example charge air cooler system in accordance with the principles of the present disclosure.

With initial reference to FIG. 1, an example charge air cooler system for a vehicle engine is illustrated and generally identified at reference numeral 10. The charge air cooling system 10 is configured to provide cooling to a charge air cooler (CAC) 12 of a vehicle engine 14 that includes a turbocharger or supercharger 16. However, it will be appreciated that system 10 is not limited to forced induction engines and may be utilized to cool intake air for a naturally aspirated engine. In such embodiments, CAC 12 is instead an air intake 12. In other embodiments, system 10 may be utilized to provide cooling to various other vehicles or systems such as, for example, marine or aeronautical systems, HVAC systems, buildings or other structures, etc.

In the example embodiment, the CAC 12 receives hot compressed air from the charger 16, absorbs heat therefrom, and subsequently supplies cooled, compressed air to an intake and cylinders (not shown) of the engine 14. In the illustrated example, CAC 12 is a two-stage, two-phase evaporative charge air cooler having a first cooler or layer 18 and a second cooler or layer 20. In the example embodiment, the two layers 18, 20 are separate and distinct layers. Accordingly, after the hot compressed air from the charger 16 is cooled in the first CAC layer 18, the cooled compressed air is further cooled in the second CAC layer 20 to below ambient temperature, as described herein in more detail. Such reduced charge air temperatures provide benefits such as increased charge density (power) and knock mitigation.

In the example implementation, the charge air cooling system 10 generally includes a first coolant circuit or loop 22 and a second coolant circuit or loop 24 having a shared condenser 26 and a shared coolant. In the example embodiment, the shared coolant is a refrigerant such as, for example, R-1234yf. However, it will be appreciated that system 10 may use any suitable coolant or refrigerant that enables system 10 to function as described herein. As such, the combined coolant loops 22, 24 enable charge air cooling system 10 to provide charge air cooling without a dedicated low temperature cooling circuit.

The charge air cooling system 10 is in signal communication with a controller 38 such as an engine control module (ECM). As described herein in more detail, the ECM is configured to selectively initiate a flow of coolant through the second loop 24 to provide increased cooling to CAC 12, particularly the second CAC layer 20, which results in increased engine power and performance and/or improved fuel economy. Moreover, separate control strategies for this secondary cooling in the second CAC layer 20 may be utilized to provide optimal CAC cooling for a given mode of vehicle operation such as a "race mode" or a "track mode."

As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In one example implementation, the first coolant loop 22 is thermally coupled to the first CAC layer 18 and is configured to provide cooling to the hot compressed charge air passing therethrough. In the example embodiment, first coolant loop 22 generally includes condenser 26, a receiver/accumulator 28, and a pump 30. The pump 30 is configured to pump the coolant around the first coolant loop 22 to the first CAC layer 18 where the coolant is subsequently heated by the hot compressed charge air. The heated coolant is then directed through a conduit 32 to the condenser 26 (e.g., a vehicle radiator) where it is cooled by ambient air, airflow created by a fan 34, and/or ram air. The resulting cooled coolant is then circulated through a conduit 36 and returned to the first CAC layer 18 to repeat the cycle. In the example embodiment, the receiver/accumulator 28 is disposed on conduit 36 downstream of the condenser 26 and upstream of the branch to the second coolant loop 24. In other embodiments, the receiver/accumulator 28 is not present.

In the example implementation, the second coolant loop 24 is fluidly coupled to the first coolant loop 22 and circulates the same coolant therethrough. However, the second coolant loop 24 is dedicated to providing cooling to the second CAC layer 20. In the example embodiment, the second coolant loop 24 generally includes a first internal heat exchanger 40, an expansion valve 42, a second internal heat exchanger 44, and a compressor 46. In some embodiments, the heat exchangers 40, 44 are not present. The compressor 46 is selectively activated (e.g., by controller 38) to circulate the coolant around the second coolant loop 24 to provide the second CAC layer 20 with coolant, which is subsequently heated by the cooled compressed charge air from the first CAC layer 18. Such additional cooling by the second coolant loop 24 enables the compressed charge air to be further cooled, for example, to a temperature below ambient.

After providing cooling in the second CAC layer 20, the now heated coolant is subsequently directed through a conduit 48 to the second internal heat exchanger 44 where it is further heated by indirect heat exchange with the coolant flowing through the first internal heat exchanger 40. The heated coolant is then directed to the compressor 46 where it compressed and directed through a conduit 50 that is fluidly coupled to the conduit 32. The compressed coolant then flows into conduit 32 and is subsequently directed through condenser 26 where it is cooled by ambient air, an airflow created by fan 34, and/or ram air.

While the compressor 46 is operating, a portion of the cooled coolant from the condenser 26 is drawn into a conduit 52 of the second coolant loop 24 that branches off of conduit 36. The coolant in conduit 52 is subsequently cooled in the first internal heat exchanger 40 by indirect heat exchange with the heated coolant passing through the second internal heat exchanger 44. The cooled coolant is then directed to the expansion valve 42 where it is at least partially vaporized and reduced in pressure for further cooling before entering the second CAC layer 20. The coolant then returns to compressor 46 and repeats the cycle.

In one example, the charge air cooling system 10 provides two-phase heat transfer in both the first and second coolant loops 22, 24, and the second coolant loop 24 is a typical vapor compression cycle. More specifically, in the first coolant loop 22, the cooled coolant exits the condenser 26 as a subcooled liquid and is pumped through conduit 36 to the first CAC layer 18. Heating in the first CAC layer 18 results in a two-phase fluid or superheated vapor, which is subsequently directed through conduit 32 back to condenser 26.

In the second coolant loop 24, the cooled coolant exiting the condenser as a subcooled liquid is drawn into conduit 52 by the pumping action of compressor 46. The subcooled liquid is further subcooled in internal heat exchanger 40 to increase the available heat of vaporization, thereby reducing mass flow rate required through compressor 46. As such, the total work of the compressor 46 is reduced, resulting in improved efficiency of the cycle. The subcooled liquid is expanded by expansion valve 42 and the resulting two-phase fluid is directed to the second CAC layer 20. Heating of the coolant in the second CAC layer 20 results in a superheated vapor, which is subsequently directed through conduit 48 back to compressor 46. The superheated vapor is then directed back to condenser 26 via conduits 50, 32 for subsequent cooling.

With continued reference to FIG. 1, in some optional embodiments, the second coolant loop 24 is incorporated into a vehicle HVAC system 90 an includes a branch conduit 92 thermally coupled to an evaporator 94 of the HVAC system 90. In the example embodiment, a portion of coolant flow in conduit 52 is at least partially vaporized in expansion valve 96 and subsequently directed to the evaporator 94 to absorb thermal energy. The resulting heated coolant is directed to conduit 48 and returned to the compressor 46.

Figure 2:
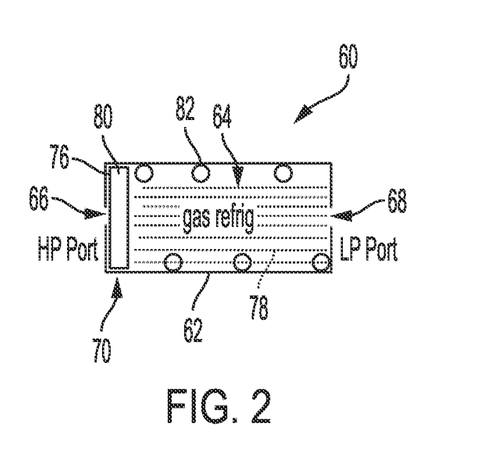
FIG. 2 is a schematic illustration of an example passive variable charge enabler (PVCE) device of FIG. 1 shown in a first position, in accordance with the principles of the present disclosure.
Figure 3:
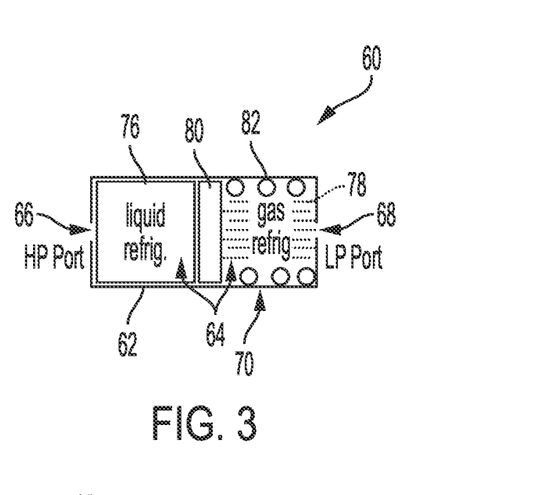
FIG. 3 is a schematic illustration of the PVCE device of FIG. 2 in a second position, in accordance with the principles of the present disclosure.
Figure 4:
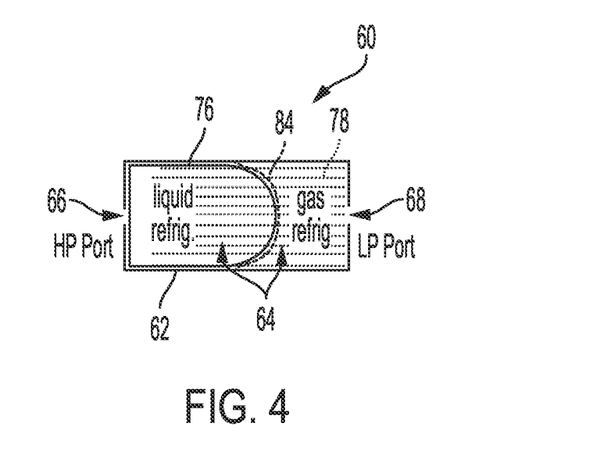
FIG. 4 is a schematic illustration of another example (PVCE) device that may be used in the system of FIG. 1, in accordance with the principles of the present disclosure.

With additional reference to FIG. 2-4, the charge air cooling system 10 further includes a passive variable charge enabler (PVCE) assembly 60 configured to passively adjust the refrigerant charge in the first coolant loop 22 without additional valves or controllers. In the example embodiment, the PVCE assembly 60 generally includes a housing 62 defining an inner volume 64, a high pressure port 66, a low pressure port 68, and a separator device 70.

In the example embodiment, a conduit 72 fluidly couples the high pressure port 66 to the system 10 at a location having liquid refrigerant at high pressure. In the illustrated example, conduit 72 is coupled to conduit 36 at a location downstream of the condenser 26 and upstream of branch conduit 52. A conduit 74 couples the low pressure port 68 to a location on the second coolant loop 24 downstream of the expansion valve 42 and upstream of the inlet to compressor 46. In the illustrated example, conduit 74 is coupled to the conduit 48 downstream of the second CAC layer 20 and upstream of compressor 46.

As illustrated in FIGS. 2-4, separator device 70 is disposed within the housing 62 and fluidly divides the inner volume 64 into a first volume 76 and a second volume 78. The first volume 76 is configured to receive liquid coolant, and the second volume 78 is configured to receive gaseous refrigerant. The separator device 70 is sensitive to pressure differentials in the system 10 and movably adjusts the liquid first volume 76 and gaseous second volume 78 based on the differential pressure, as described herein in more detail. For example, as the first volume increases, the second volume 78 decreases and vice versa.

It will be appreciated that separator device 70 may have any suitable configuration that enables PVCE assembly 60 to function as described herein, including a piston type (FIGS. 2 and 3) and a diaphragm type (FIG. 4). In the example embodiment shown in FIGS. 2 and 3, separator device 70 is a piston type device having a piston 80 and a biasing mechanism 82 (e.g., a spring), which is configured to bias the piston 80 toward the high pressure port 66. In the example embodiment shown in FIG. 4, separator device 70 is a diaphragm type device having a pressure sensitive diaphragm 84.

In the example embodiment, the separator device 70 is movable between a first position (e.g., FIG. 2) and a second position (e.g., FIG. 3). In the first position, system 10 is operating in a pump only mode (compressor 46 is off). As such, there is no pressure differential between the high pressure port 66 and the low pressure port 68, and the separator device 70 is forced toward the high pressure port 66. In the second position, system 10 is operating in a pump and compressor mode (pump 30 and compressor 46 are on). Because the compressor 46 is active, there is lower pressure at low pressure port 68, which drives a pressure differential across PVCE assembly 60 to compress the piston 80 and draw coolant into the adjustable first volume 76. In some configurations, the PVCE assembly 60 includes a damper (not shown) configured to dampen oscillations that may occur while the system is in operation.

In operation, the charge air cooling system 10 is configured to operate between the pump only mode and the pump and compressor mode. The pump only mode utilizes only the first coolant loop 22 for cooling charge air under low engine load conditions. The pump and compressor mode additionally utilizes the second coolant loop 24 for greater charge air cooling under high engine load conditions. However, the refrigerant charge requirements are different between the first and second coolant loops 22, 24; the pumped loop 22 requires more coolant than the vapor compression loop 24 during operation, but this may be more than the compressor 46 can handle and potentially lead to condenser pressure spiking.

Accordingly, in order to prevent such conditions, the PVCE assembly 60 is configured to add liquid coolant to the circulation in system 10 in pump only mode, and remove liquid coolant from circulation when the compressor 46 is switched on in the pump and compressor mode. In the pump only mode, there is little or no pressure differential across the high and low pressure ports 66, 68, and the separator device 70 is biased to push liquid coolant out of the housing 62 (see FIG. 2). In the pump and compressor mode, the compressor 46 generates a pressure differential across the ports 66, 68 (with the HP port 66 being higher), which moves the separator device 70 and expands first volume 76 to receive more liquid. In this way, liquid refrigerant is drawn into volume 76 and out of circulation within system 10, thereby reducing condenser pressure.

In pump only mode, compressor 46 is turned off and expansion valve 42 is optionally closed. Flow only through the first coolant loop 22 may be a default mode of operation for normal or typical driving and/or for improved fuel economy operation of the vehicle. When reduced air charge temperature (ACT) is required or requested, for example when high levels of torque are requested (e.g., racing or track mode), the system 10 enters the pump and compressor mode and compressor 46 is turned on and expansion valve 42 is opened (if it was closed) to initiate a flow of coolant through the second coolant loop 24. This provides reduced air charge temperature to facilitate significantly increasing engine performance and power output.

Figure 5:
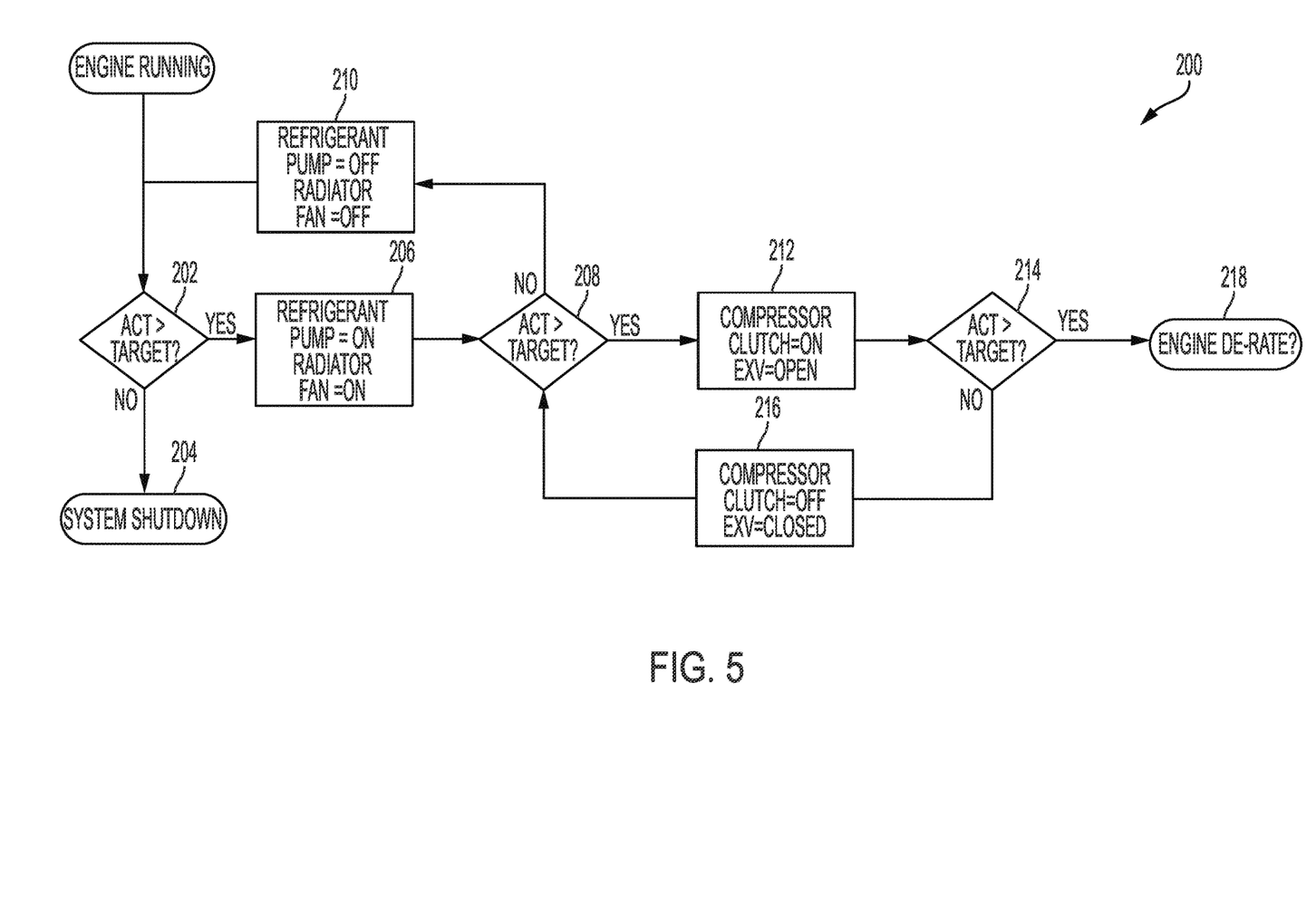
FIG. 5 is a schematic diagram of an example operation of the charge air cooler system shown in FIG. 1 in accordance with the principles of the present disclosure.

FIG. 5 illustrates an example method 200 of controlling a vehicle having charge air cooling system 10. The method includes determining if a first measured ACT is greater than a target ACT at step 202. Such temperature measurements may be performed with various vehicle sensors such as a temperature sensor (not shown). In some examples, the target ACT is determined by controller 38 or other vehicle control depending on a given driving mode or request (e.g., driver requests the vehicle to enter a race mode). In one example, the target ACT is below a measured ambient temperature. If the first measured ACT is not greater than the target ACT, the system 10 is shut down at step 204. In one example, system 10 is shut down in reverse order by first turning off compressor 46 and closing expansion valve 42 followed by turning off pump 30.

If the first measured ACT is greater than the target ACT, control proceeds to step 206 where pump 30 and radiator fan 34 are turned on. At step 208, it is determined if a second measured ACT is greater than the target ACT. The second measured ACT is determined after the pump 30 and radiator fan 34 are turned on. If the second measured ACT is not greater than the target ACT, control proceeds to step 210 where pump 30 and radiator fan 34 are turned off. Control then returns to step 202.

If the second measured ACT is greater than the target ACT, control proceeds to step 212 where compressor 46 is turned on and expansion valve 42 is opened. At step 214, it is determined if a third measured ACT is greater than a target ACT. The third measured ACT is determined after the compressor 46 is turned on and the expansion valve 42 is opened. If the third measured ACT is not greater than the target ACT, control proceeds to step 216 where the compressor 46 is turned off and expansion valve 42 is closed. Control then returns to step 208. If the third measured ACT is greater than the target ACT, control proceeds to step 218 and the controller 38 determines whether to take further action such as performing an engine de-rate.

Figure 6:
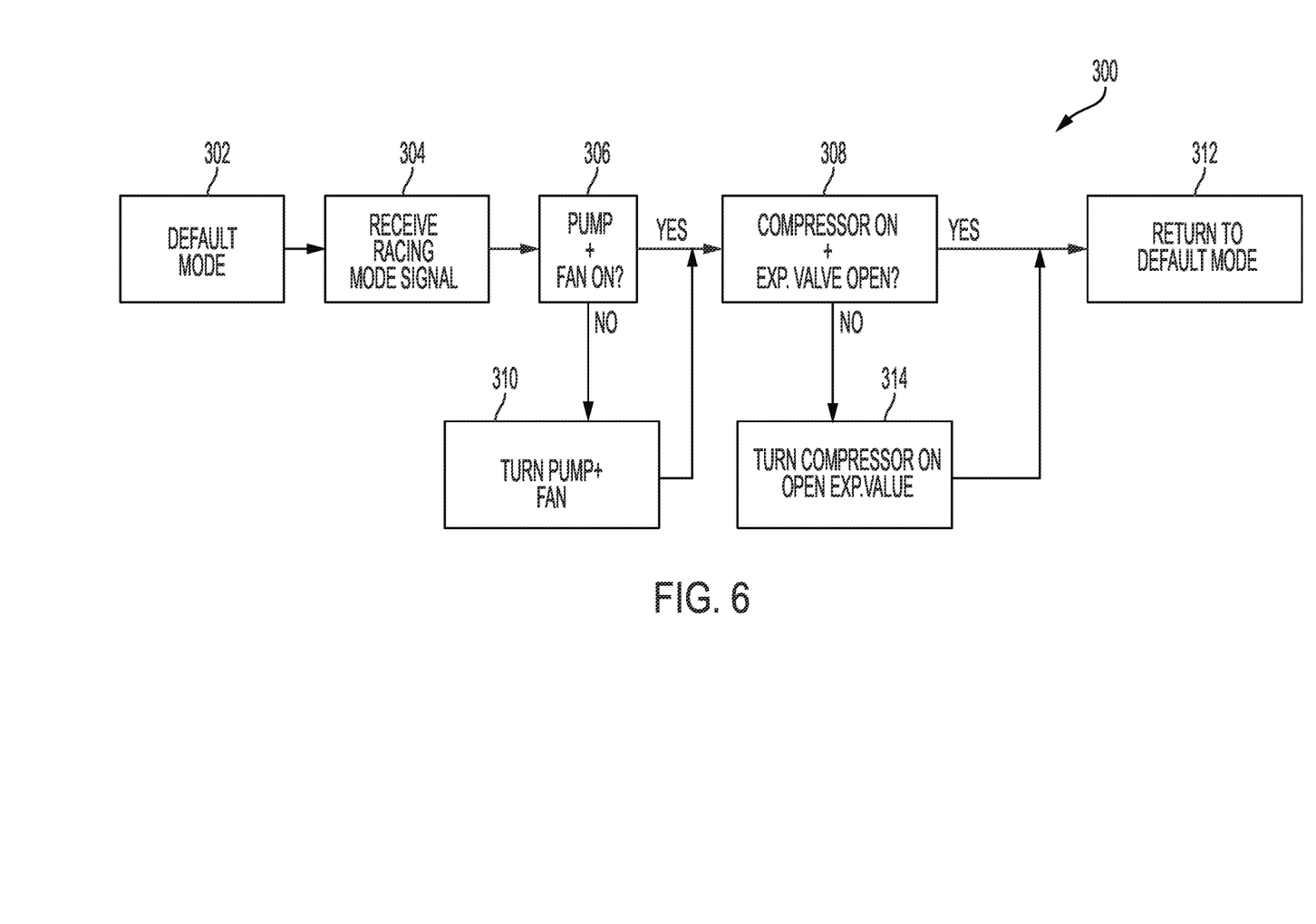
FIG. 6 is a schematic diagram of another example operation of the charge air cooler system shown in FIG. 1 in accordance with the principles of the present disclosure.

FIG. 6 illustrates an example method 300 of controlling a vehicle configured to operate between a default mode (pump only mode) and a racing mode (pump and compressor mode). The default mode can correspond to typical vehicle driving or performance (or a fuel economy mode), and the racing mode can correspond to the vehicle operating with increased engine output or performance. The method includes operating the vehicle in the default driving mode at step 302. At step 304, vehicle controller 38 receives a signal indicating the driver has activated the racing mode, for example, via a vehicle user interface (not shown). At step 306, controller 38 determines if pump 30 and fan 34 are on. If yes, control proceeds to step 308. If no, at step 310, controller 38 turns on pump 30 and fan 34. Control then proceeds to step 308.

At step 308, controller 38 determines if compressor 46 is on and if expansion valve 42 is open. If yes, control proceeds to step 312. If no, at step 314, controller 38 turns on compressor 46 and opens expansion valve 42. Control then proceeds to step 312. At step 312, controller 38 returns the vehicle to the default driving mode after receiving a signal indicating the driver has deactivated the racing mode or activated the default driving mode (e.g., via a touch screen user interface), or when the vehicle is restarted.

Described herein are system and methods for providing additional cooling to intake air or a charger CAC. An air cooler system includes a two-stage, two-phase evaporative cooler to provide a merged low temperature cooling loop and AC cooling loop to save packaging space. The first loop includes a coolant pump to circulate coolant to cool a first layer of the CAC. The second loop, which shares a condenser with the first loop, includes a compressor, expansion valve, and internal heat exchanger to circulate the coolant to provide further charge air cooling in a second layer of the CAC.

A PVCE assembly is configured to passively and automatically adjust its liquid volume without additional valves or controllers, which can add cost and complexity to systems. The passive volume adjustment is accomplished through a differential pressure imposed upon it by ports on either side of the assembly. When the compressor is active, the pressure on the suction side drops and the condenser pressure rises. This change in differential pressure across the PVCE assembly and allows the mechanism inside to adjust its liquid volume. The expansion of the liquid volume in the container allows refrigerant to flow in through the communication port, thereby removing refrigerant circulating in the system. By tuning the PVCE assembly, optimal refrigerant charge can be established during the different operating conditions (e.g., modes) to maximize efficiency of the pump and compressor throughout the system's operating envelope.

Although not shown, it will be appreciated that the PVCE assembly described herein may be utilized in various thermal system configurations. For example, the PVCE assembly may be utilized in a traditional vapor compression cycle with the high pressure port fluidly coupled downstream of the condenser and upstream of the expansion valve, and the low pressure port downstream of the expansion valve or evaporator and upstream of the compressor.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An air cooling system for a vehicle engine, the system comprising:
    an air intake configured to receive intake air for delivery to the engine;

a first coolant loop thermally coupled to the air intake to provide cooling to the intake air;

a pump for circulating coolant through the first coolant loop;

a second coolant loop thermally coupled to the air intake to provide further cooling to the intake air, the second coolant loop undergoing a vapor compression cycle;

a compressor for circulating coolant through the second coolant loop;

wherein the first and second coolant loops are separate loops using a common condenser; and a passive variable charge enabler (PVCE) assembly configured to remove coolant circulating in the system when the compressor is on.

2. The system of claim 1, wherein the PVCE assembly includes:

a housing defining an inner volume; and a separator device disposed within the housing and separating the inner volume into first and second volumes, wherein the first volume is configured to receive the removed coolant.

3. The system of claim 2, wherein the separator is a piston.

4. The system of claim 2, wherein the separator is a diaphragm.

5. The system of claim 1, wherein the PVCE assembly includes a housing having a first port and a second port each fluidly coupled to at least one of the first and second coolant loops, wherein a pressure differential across the PVCE assembly causes the PVCE assembly to receive the removed coolant.

6. The system of claim 5, wherein the first port is a high pressure port fluidly coupled to the first coolant loop at a location having high pressure liquid coolant.

7. The system of claim 6, wherein the second port is a low pressure port fluidly coupled to the second coolant loop.

8. The system of claim 7, wherein the second coolant loop further includes an expansion valve, and wherein the second port is fluidly coupled to the second coolant loop at a location downstream of the expansion valve and upstream of the compressor.

9. The system of claim 8, wherein the first port is fluidly coupled to the first coolant loop at a location downstream of the condenser.

10. The system of claim 1, wherein the first and second coolant loops circulate a shared refrigerant.

11. The system of claim 10, further comprising:

an HVAC branch conduit fluidly coupled to the second coolant loop between a first location upstream of the air intake, and a second location downstream of the air intake; and a vehicle HVAC evaporator thermally coupled to the HVAC branch conduit.

12. The system of claim 1, wherein the second coolant loop includes an expansion valve upstream of the CAC and downstream of the condenser.

13. The system of claim 12, wherein the second coolant loop includes a first internal heat exchanger and a second internal heat exchanger, wherein the first internal heat exchanger is disposed upstream of the expansion valve and downstream of the condenser, and the second internal heat exchanger is disposed downstream of the CAC and upstream of the compressor.

14. The system of claim 1, wherein the intake air is compressed charge air received from a turbocharger or a supercharger, and wherein the air intake includes a charge air cooler (CAC) configured to cool the compressed charge air;

wherein the first coolant loop is thermally coupled to the CAC to provide cooling to the compressed charge air; and wherein the second coolant loop is thermally coupled to the CAC to provide further cooling to the compressed charge air.

15. The system of claim 14, wherein the CAC includes a first charge air cooler layer and a second charge air cooler layer, the first and second charge air cooler layers being distinct layers.

16. The system of claim 15, wherein the first coolant loop is thermally coupled to the first charge air cooler layer and the second coolant loop is thermally coupled to the second charge air cooler layer.

17. The system of claim 14, further comprising a controller in signal communication with the pump and the compressor, wherein upon receipt of a signal indicating a first measured air charge temperature (ACT) is greater than a target ACT, the controller is configured to turn the pump on.

18. The system of claim 17, wherein upon receipt of a signal indicating a second measured ACT is greater than the target ACT, the controller is configured to turn the compressor on.

19. The system of claim 18, wherein upon receipt of a signal indicating a third measured ACT is greater than the target ACT, the controller is configured to de-rate the vehicle engine.

20. The system of claim 18, wherein upon receipt of a signal indicating the third measured ACT is less than the target ACT, the controller is configured to turn off the compressor, and wherein upon receipt of a signal indicating the second measured ACT is less than the target ACT, the controller is configured to turn off the pump.

* * * * *